United States Patent
Stephan, III et al.

(10) Patent No.: US 9,569,519 B2
(45) Date of Patent: Feb. 14, 2017

(54) CLIENT-SIDE DIRECTED COMMANDS TO A LOOSELY COUPLED DATABASE

(71) Applicants: Dean Emerson Stephan, III, San Francisco, CA (US); Mihnea Andrei, Issy les Moulineaux (FR)

(72) Inventors: Dean Emerson Stephan, III, San Francisco, CA (US); Mihnea Andrei, Issy les Moulineaux (FR)

(73) Assignee: SYBASE, INC., Dublin, CA (US)

( * ) Notice: Subject to any disclaimer, the term of this patent is extended or adjusted under 35 U.S.C. 154(b) by 315 days.

(21) Appl. No.: 14/138,487

(22) Filed: Dec. 23, 2013

(65) Prior Publication Data

US 2015/0178328 A1 Jun. 25, 2015

(51) Int. Cl.
*G06F 17/30* (2006.01)

(52) U.S. Cl.
CPC ... *G06F 17/30584* (2013.01); *G06F 17/30545* (2013.01)

(58) Field of Classification Search
CPC .............. G06F 17/30584; G06F 17/30545; G06F 17/30292; G06F 3/067
See application file for complete search history.

(56) References Cited

U.S. PATENT DOCUMENTS

| | | | |
|---|---|---|---|
| 2006/0041565 A1* | 2/2006 | Cuomo | G06F 9/5033 |
| 2009/0193059 A1* | 7/2009 | Wall | G06F 11/2097 |
| 2012/0084315 A1* | 4/2012 | Schneider | G06F 17/30442 707/769 |

* cited by examiner

*Primary Examiner* — James E Richardson
(74) *Attorney, Agent, or Firm* — Sterne, Kessler, Goldstein & Fox P.L.L.C.

(57) ABSTRACT

Dynamically directing a command to a node in a distributed database is described. An example method includes receiving the command from a client application to access data in the distributed database, where the command contains a set of parameters. A primary key is constructed from at least some of the parameters. The client further generates routing information from a node-partition table based on a comparison of the primary key with an entry in the node-partition table, where the node-partition table maps the primary key to a node in the distributed database. Accordingly, the command is directed to the node in the distributed database based on the routing information.

16 Claims, 9 Drawing Sheets

CLIENT-SIDE DIRECTED COMMANDS TO A LOOSELY COUPLED DATABASE

BACKGROUND

Field

The embodiments generally relate to relational databases in a computing environment.

Background Art

In a loosely-coupled database system, such as a distributed database system, client applications frequently send to database server(s) queries affecting a row or a set of rows in the database, where the queries are processed using a single key that identifies the appropriate nodes in the database. Some systems attempt to calculate the key from the client applications. This is problematic because of the data movement or reorganization in the database. Other methods partition the logical database into distinct independent parts and attempt to direct the queries to the appropriate nodes from the server side. However, such partition mechanism involves overhead and extra cost due to the fact that extra hops are required when the burden is on the server atone to direct the queries to the appropriate nodes in the distributed database.

The problems are exacerbated in rapid transaction processing systems with large data store requirements. Therefore, conventional systems fail to provide an ideal mechanism to direct the commands or queries generated from the application clients to the appropriate nodes in the data grid with optimal performance, manageability and availability.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED. DESCRIPTION

Embodiments relate to dynamically directing a command to a node in a distributed database. As will be described in further detail below, embodiments can provide a client-side approach to direct the command to the appropriate node in the database based on the information sent from the server to the client. Embodiments can further provide a dynamic approach to direct the commands, thus solves the issues associated with data movement and database reconfiguration. Embodiments can cache a node-partition table by the client library on the client to direct the commands to a node in the data grid, which reduces or eliminates overhead to make unnecessary connections to the server to determine to which node the command should be directed, thus improving performance, availability and manageability.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 1:
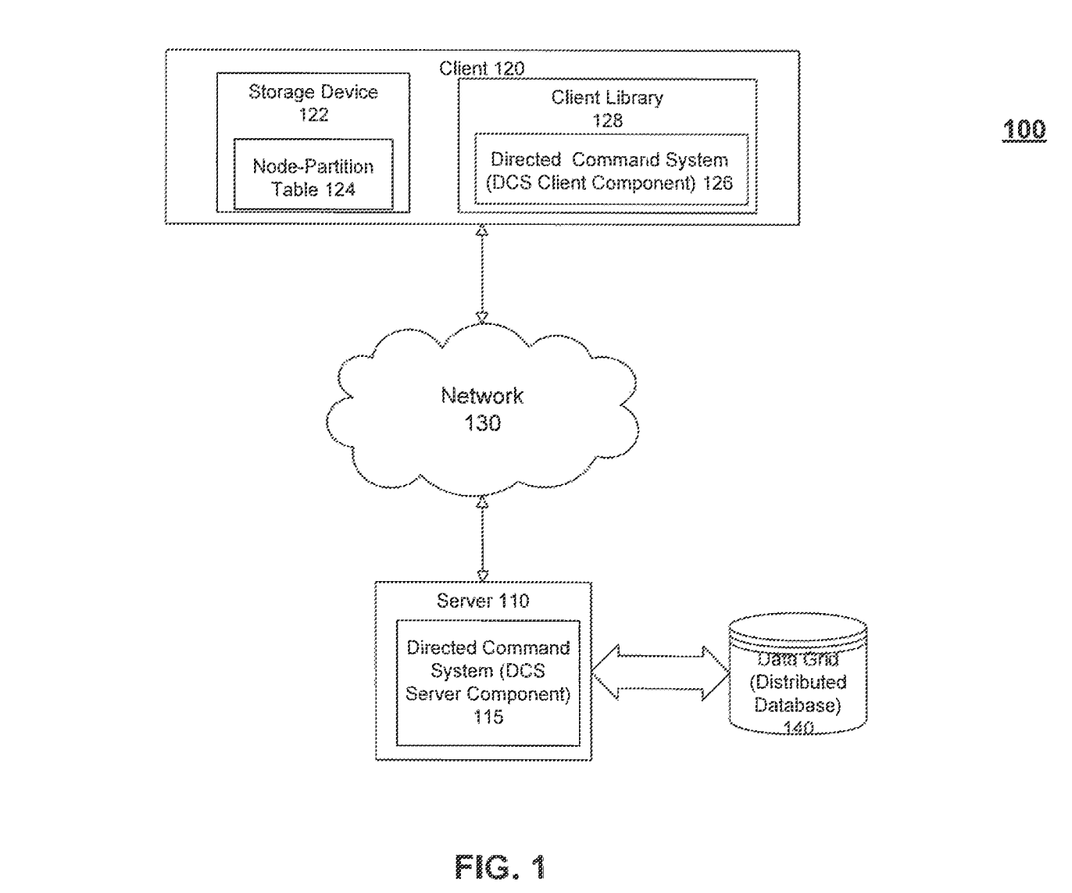
FIG. 1 illustrates a system for dynamically directing a command to a node in a distributed database, according to an embodiment.

FIG. 1 illustrates a system 100 according to an embodiment. System 100 includes a server 110, a server component of directed command system 115, a client 120, a client component of directed command system 126, a network 130, and a data grid or distributed database 140.

Client 120 communicates with server 110 over the network 130. Although only one server 110 is shown, more servers may be used. Network 130 may be any network or combination of wired and wireless networks that carry data communication. Such network can include, but is not limited to, a local area network, medium area network, and/or wide area network such as the Internet.

Client 120 includes a storage device 122 and a client component of directed command system 126. In one embodiment, storage device 122 hosts a node-partition table 124, which stores mapping information between the command and the node in the data grid 140. Data grid 140 can include multiple nodes. Although node-partition table 124 is depicted to reside on storage device 122 on client 120, it can be located in any backing store residing on or off client 120.

Client 120 also hosts a client library 128. Which in turn hosts a client component of directed command system 126. Client library 128 may be an applications programming interface (API) that provide generic building blocks for constructing distributed client applications. Based on the mapping information, client component of directed command system 126 on client library 128 can direct the command to the appropriate node in data grid 140. In some embodiments, client component of directed command system 126 may be a component independent of client library 128. Although only one client 120 is shown, more clients may be used. Storage device 122, which will be described in detail with respect to FIG. 9, can be any device for recording and storing information, which includes but is not limited to, flash memory, magnetic tape and optical discs.

Server 110 can host server component of directed command system 115. As illustrated in FIG. 1, client 120 can send data requests to server 110, which can in turn invoke server component of directed command system 115 for further processing. In some embodiments, server 110 and DCS 115 are separate from data grid 140. In other embodiments, data grid 140 may include server 110, which in turn hosts DCS 115 (not shown).

Server component of directed command system 115 and client component of directed command system 126 can be software, firmware, or hardware or any combination thereof in a computing device. System 100 can be implemented on or implemented by one or more computing devices. As will be further described with respect to FIG. 9, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O (input/output) device for communicating over wired or wireless communication link(s).

Figure 2:
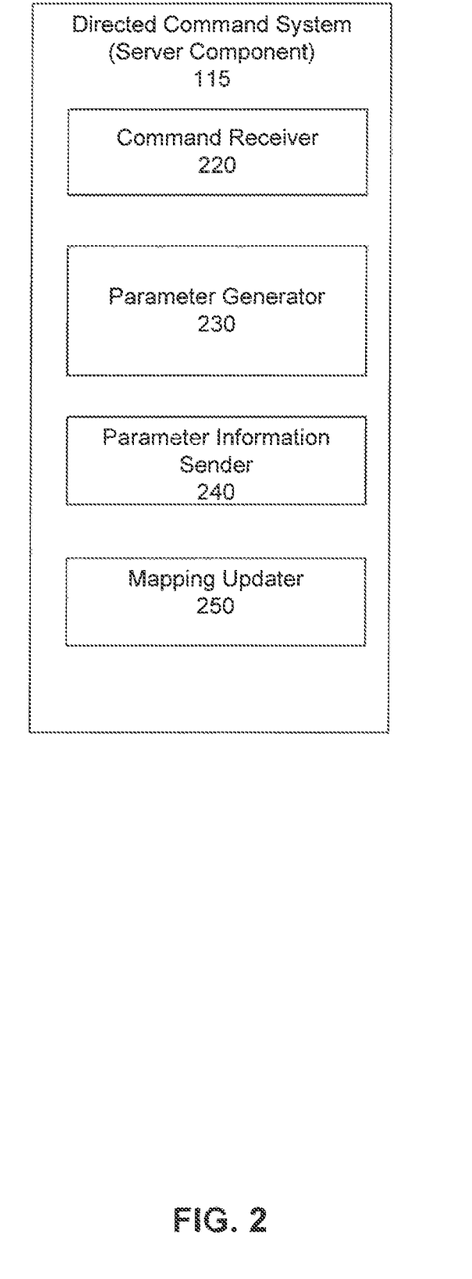
FIG. 2 illustrates elements of a server component of the directed command system, according to an embodiment.

FIG. 2 illustrates elements of a server component of the directed command system 115, according to an embodiment. In the example shown in FIG. 2, server component of the directed command system 115 includes command receiver 220, parameter generator 230, and parameter information sender 240.

Command receiver 220 receives a command from client library to access data in a distributed database, upon determination that a client lacks parameter interpretation information. In some embodiments, the parameter interpretation information may include information on a set of parameters that may be used to build a primary key to direct the command to a proper node in the distributed database. In other embodiments, the parameter interpretation information may include the data type or the order of the parameters that is used to build a primary key to direct the command to a proper node in the distributed database.

The command may be associated with a query for data in the data grid 140. The client library may determine that the client library does not contain the parameter interpretation information associated with the command. In one embodiment, the command may be a remote procedure call (RPC) that allows a computer program to cause a subroutine or procedure to execute in another system. For example, command receiver 220 receives an RPC initiated by client library from client 120, which sends a request message to a known remote server 110 to execute a stored procedure with supplied parameters. In another embodiment, the command may be a command using parameterized language, such as string SQL (Structured Query Language). In still another embodiment, the command may be in the form of dynamic SQL statements such as prepared statements.

Parameter generator 230 generates parameter interpretation information for building the primary key from the set of parameters associated with the command. According to one embodiment, parameter generator 230 examines the command to determine what parameters which may be used to generate parameter interpretation information for the command. For example, in a constrain tree schema, parameter generator 230 determines a set of parameters that may be used to identify a primary key for the command. In one embodiment, parameter generator 230 may determine that a single parameter (such as a social security number) may be used to generate the primary key. In another embodiment, in the event that parameter generator 230 determines that a set of parameters (such as a customer number and a timestamp) may be used for generating the primary key, parameter generator 230 may further identify the order of the parameters to be used to determine the primary key. Alternatively, parameter generator 230 may identify the data type of the parameters to be used to generate the primary key. The parameter interpretation information can be stored in a data store that is coupled to the DCS 115.

Parameter information sender 240 sends the parameter interpretation information to the client library, where the client library constructs a primary key from at least some of the parameters based on the parameter interpretation information. As will be illustrated in detail in FIG. 3 below, the client library generates routing information from a node-partition table based on a comparison of the primary key with an entry in the node-partition table, and directs the command to the corresponding node in the distributed database based on the routing information. The routing information can include, for example, and is not limited to information on the corresponding node that the command may be directed to. In some embodiments, the node-partition table maps the primary key to a node in the distributed database, and farther includes an order of the parameters for constructing the primary key.

For example, parameter information sender 240 sends parameter interpretation information to the client library via a notification system. Based on the notification, the client library can construct a primary key from at least some of the parameters based on the parameter interpretation information. The client library may further generate routing information from a node-partition table based on a comparison of the primary key with an entry in the node-partition table. Client library may still further direct the command to the corresponding node in the distributed database based on the routing information. The node-partition table maps the primary key to a node in the distributed database.

In some embodiments, server component of the directed command system 115 contains mapping updater 250. In one embodiment, mapping updater 250 dynamically updates mapping information in the node-partition table upon detecting a reconfiguration of the distributed database 140, where the mapping information maps a set of keys to the nodes in the distributed database. For example, during the course of client connection, mapping updater 250 may send data grid reconfiguration information both synchronously and asynchronously to the client library. In an embodiment, upon detecting that a command is directed to an incorrect node in the data grid based on the incorrect information of the node-partition table, mapping updater 250 can update the node-partition table with correct mapping information between the primary key and the appropriate node in the distributed database. The example functionalities of mapping updater 250 can be further illustrated in FIG. 6.

Figure 6:
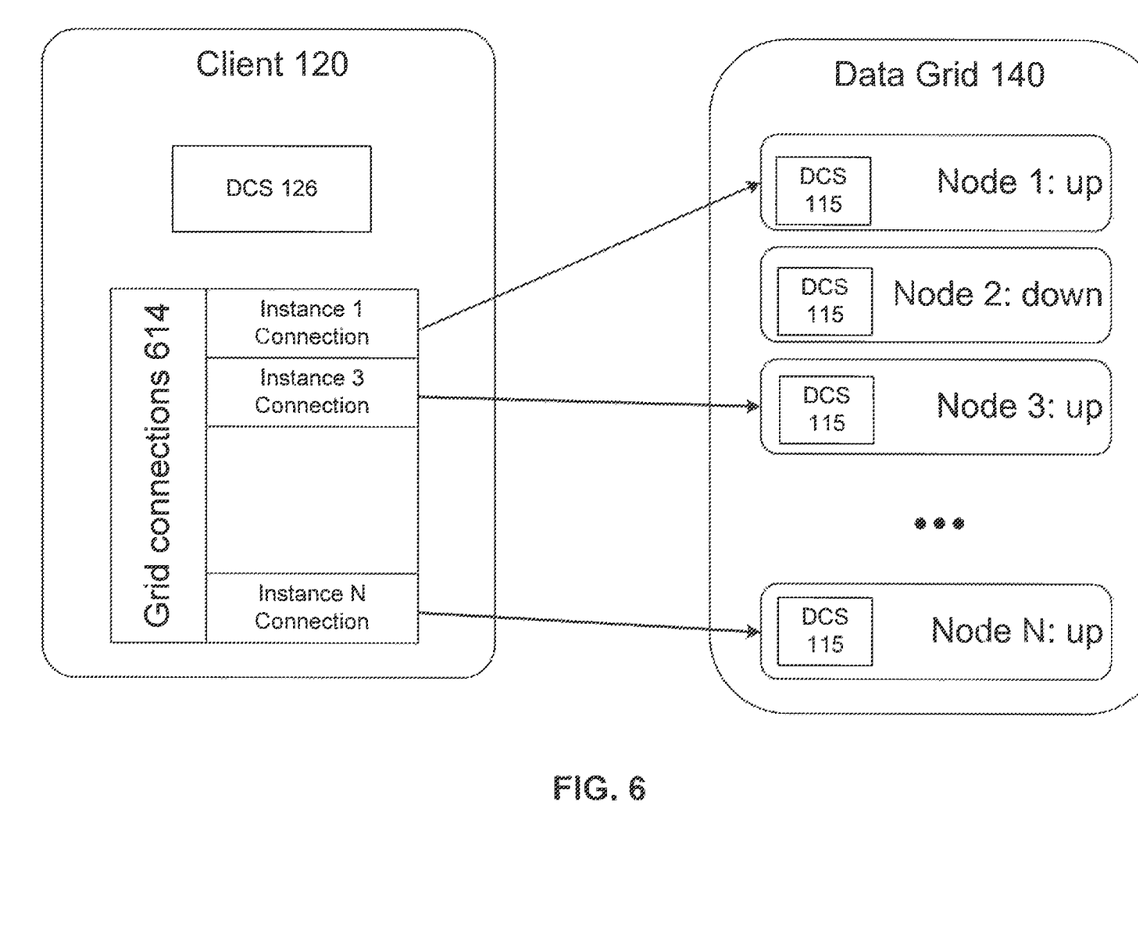
FIG. 6 depicts example interaction between a client and a data grid, according to an embodiment.

FIG. 6 depicts example interaction between client 120 and data grid 140, according to an embodiment. In this embodiment, client 120 hosts Directed Command System (DCS client component) 126. Client 120 further maintains multiple grid connections 614 to data grid 140. Data grid 140 contains multiple nodes 1 to N, which have a DCS 115 (server component) installed respectively in each node. In case that a node (such as Node 2) is down (off-line), data grid 140 can move the data off the node and distribute the data to one or more other nodes that are up and running (on-line). As a result of this data movement, mapping updater 250, which is an element of DCS 115, can send the data reconfiguration information to DCS 126 residing on client 120. Thus, mapping updater 250 can update the node-partition table 124 with the updated mapping information between the primary key and the appropriate node in data grid 140. When Node 2 becomes available again (e.g., on-line), data grid 140 processes another round of data movement to migrate the original data back from the one or more other nodes to Node 2. Likewise, mapping updater 250 on DCS 115 of data grid 140 can notify DCS 126 on client 120 and update node-partition table 124 accordingly.

Returning to FIG. 2, in one embodiment, server component of the directed command system 115 contains command redirector 260. In an embodiment, command redirector 260 acts as an intermediate between the client and the appropriate node and redirects the command to the appropriate node in distributed database 140 upon detecting that the command is directed by client 120 to an incorrect node. For example, the routing information of node-partition table 124 on client 120 may be obsolete or incorrect. Therefore, in one embodiment, mapping updater 250 and command redirector 260 implement a dynamic correcting mechanism to ensure client 120 directs commands to the correct node within data grid 140. In another embodiment, the server notifies client library 124 that the results (e.g., data) of the query associated with the command are on another node while sending the command to that node.

Figure 3:
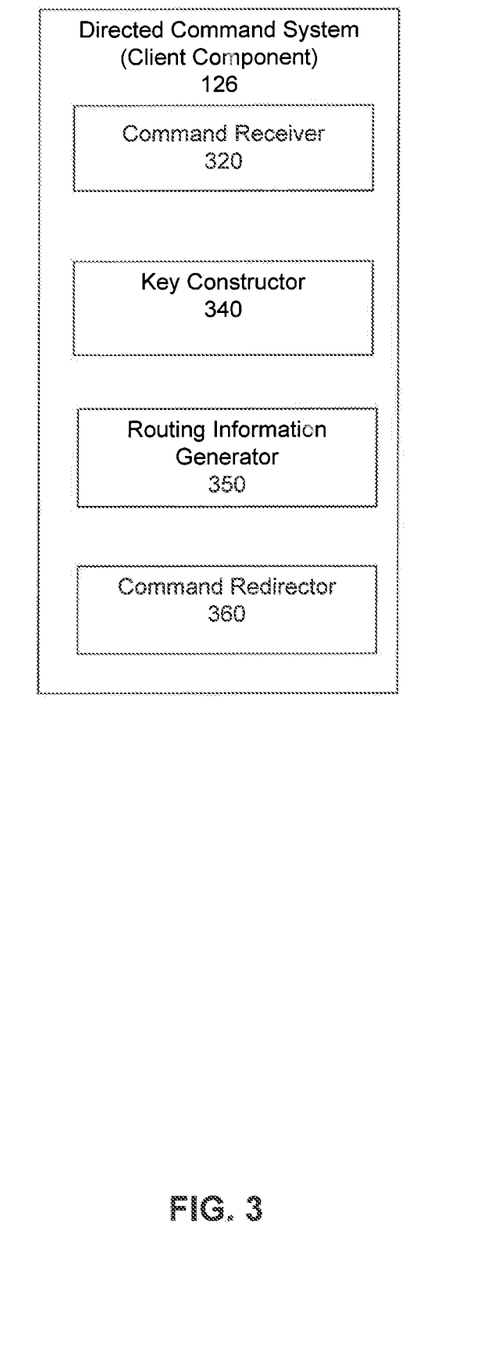
FIG. 3 illustrates elements of a client component of the directed command system, according to an embodiment.

FIG. 3 illustrates elements of a client component of the directed command system 126, according to an embodiment. In the example shown in FIG. 3, client component of the directed command system 126 includes command receiver 320, key constructor 340, routing information generator 350 and command director 360.

Command receiver 320 receives the command from a client application to access data in the distributed database 140, where the command contains a set of parameters. As discussed above, command receiver 320 may receive a RPC command, a parameterized language command or a dynamic SQL command.

In some embodiments, commander receiver 320 further includes a parameter receiver. Upon determination that client library lacks parameter interpretation information associated with the command, the client sends the command to server 110 for analysis and server 110 identifies a set of parameters may be used for building a primary key. Parameter receiver can receive the identified parameters and pass them to key constructor 340 for further processing.

Key constructor 340 constructs a primary key for the command from at least some of the parameters. For example, key constructor 340 may construct, on client 120, a primary key from the combination of the parameters. In one embodiment, key constructor 340 determines the server byte order and character set and performs any necessary data conversions prior to constructing the key. In another embodiment, key constructor 340 constructs the primary key based on the order of the parameters identified by server 110.

In still another embodiment, key constructor 340 constructs the primary key based on the data types of the parameters. In still another embodiment, key constructor 340 constructs the primary key based on the combination of the methods discussed above.

Routing information generator 350 generates routing information from a node partition table 124 based on a comparison of the primary key with an entry in the node-partition table 124. The routing information can include, for example, and is not limited to information on which node that the command may be directed to. The node-partition table 124 maps the primary key for the command to a corresponding node in the distributed database 140. The example functionalities of routing information generator 350 can be further illustrated in FIG. 7.

Figure 7:
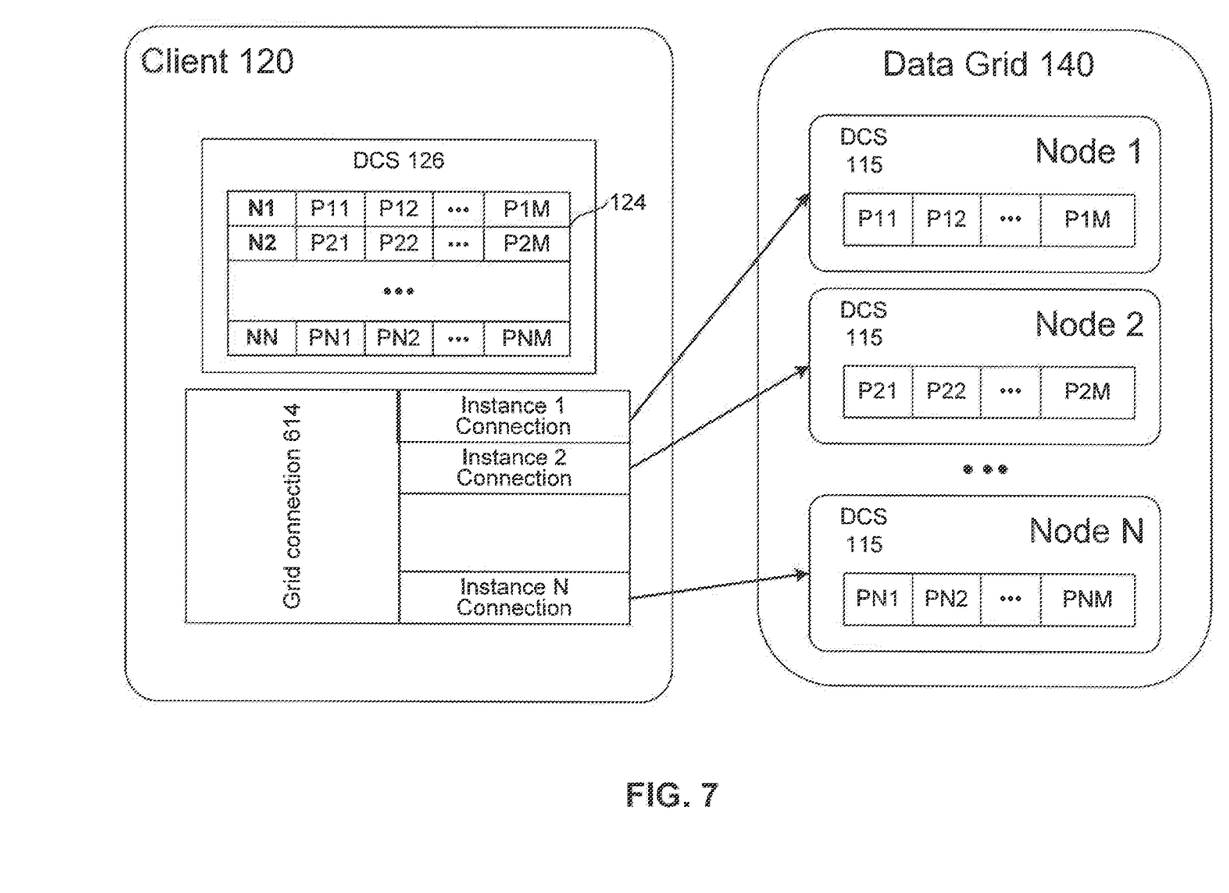
FIG. 7 depicts example interaction between a client and a data grid, according to another embodiment.

FIG. 7 depicts example interaction between client 120 and data grid 140, according to another embodiment. In this embodiment, node-partition table 124 can be cached on DCS 126 of client 120, which maps the primary keys for corresponding commands to corresponding nodes in data grid 140. However, node partition table 124 may be a separate component from DCS 126 in client 120 or reside outside of client 120. In this example, for a primary key P11, node-partition table 124 maps P11 to Node 1 in data grid 140. Routing information generator 350 can generate routing information for the corresponding command based on the comparison of the primary key generated for the command with an entry (such as key P11) in node-partition table 124 to map to the appropriate node (such as Node 1).

According to an embodiment, node-partition table 124 is constructed dynamically as client library 128 connects to distributed database 140. In this embodiment, because the available data may be scarce at the initial stage of building node-partition table 124, a round robin approach is employed if the command does not map to a corresponding entry in node-partition table 124. For example, the first command may be sent to Node 1 if there is no match in node-partition table 124. Likewise, the second command may be sent to Node 2 if no match is found to distribute the queries across the nodes of data grid 140. According to another embodiment, node-partition table 124 is built using a bootstrapping approach, where node-partition table 124 is prepopulated with data obtained through previous client connections to distributed database 140. Furthermore, node-partition table 124 may contain, for example, data in flat files or tables, or any other hacking store mechanism.

Returning to FIG. 3, command director 360 directs the command to the node in distributed database 140 based on the routing information. In an embodiment, equipped with the routing information generated by routing information generator 350, command director 360 directs the command to the appropriate node accordingly.

Embodiments of the elements of directed command system 115 and 126 in FIGS. 2 and 3, as described herein, may be further configured to run in parallel. Such parallel execution of these elements would increase the efficiency and speed of quantitative mood shift identification system 115.

Figure 4:
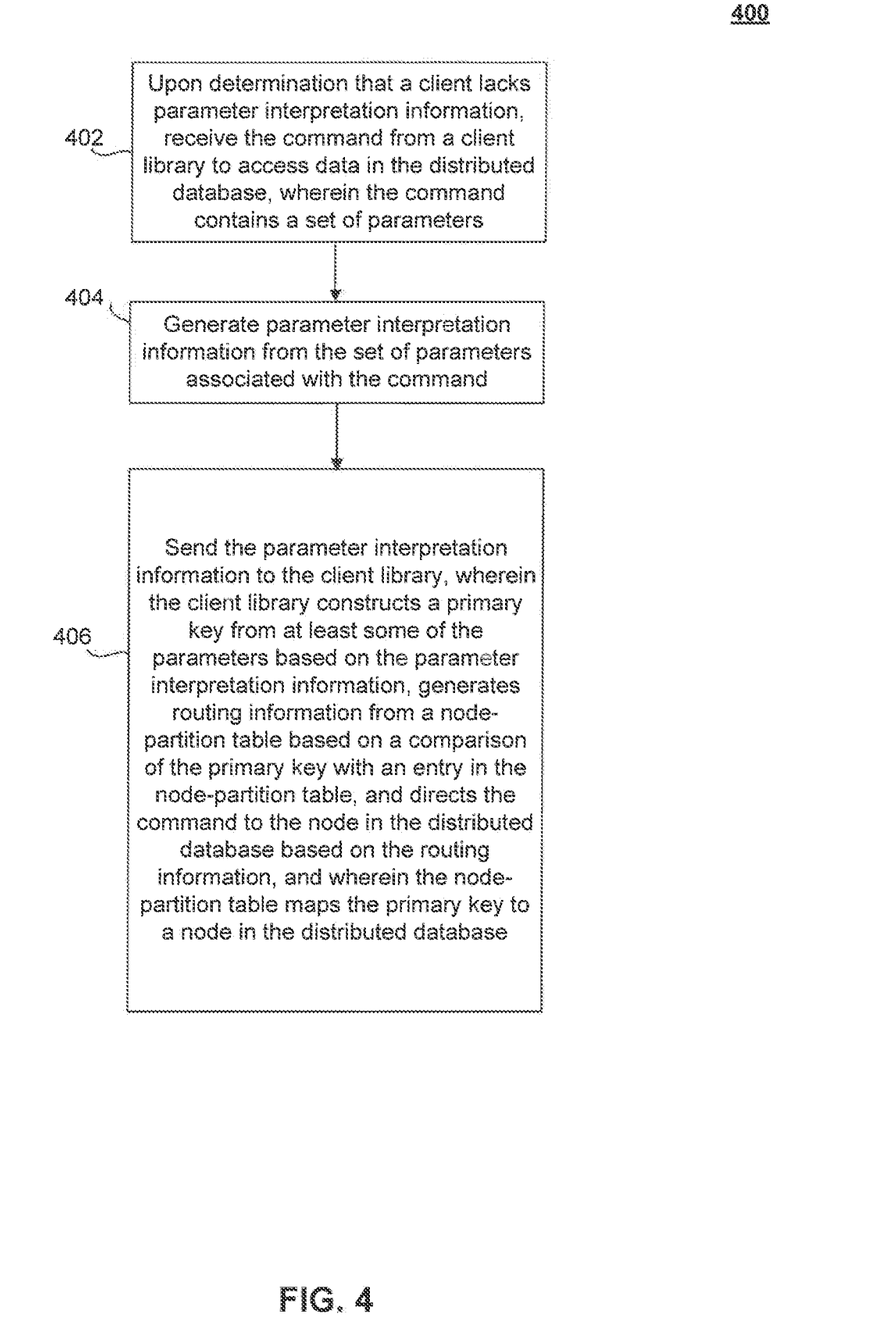
FIG. 4 is a flowchart for a method for dynamically directing a command to a node in a distributed database, according to an embodiment.

FIG. 4 is a flowchart for a method 400 for dynamically directing a command to a node in distributed database 140, according to an embodiment. In an embodiment, method 400 is performed by a server. For ease of explanation, method 400 will be described with respect to DCS 115 of FIG. 2, which resides on server 110, as described above. However, method 400 is not intended to be limited thereto.

At stage 402, upon determination that a client lacks parameter interpretation information, the command is received from a client library on the client to access data in the distributed database, and the command contains a set of parameters. For example, command receiver 220 may receive the command from the client library on the client to connect to distributed database. According to an embodiment, the server may receive an initial connection to connect to distributed database 140 from a client application, if the client does not have the parameter interpretation information. Client library 128 may handle the creation of subsequent connections to distributed database 140 for the client application.

At stage 404, parameter interpretation information is generated from the set of parameters associated with the command in DCS 115. For example, parameter generator 230 identifies and generates a set of parameters that may be used to build a primary key for the command to generate routing information to a proper node in the distributed database. According to one embodiment, server 110 may examine the command to identify the type of the command. For example, server 110 may identify the command as a point command or local command, which may only affect a single row. Alternatively, server 110 may identify a command as a local command, which may affect several rows or an all-data command which may affect all rows. In one embodiment, if the command is an all-data command and affects all rows, the command is forwarded to server 110 bypassing the directed command system 126 on client 120 and a task is allocated to server 110 to direct the command to any node which server 110 determines is appropriate. Conversely, if the command is a point command or local command, a set of parameters associated with the command is identified, which may be used for generating the routing information and method 400 proceeds to stage 406.

At stage 406, the parameter interpretation information is sent to the client library. For example, parameter transferor 240 transfers the parameters to client library 128 on client 120.

In an embodiment, the parameter interpretation information enables client library 128 to construct a primary key for the command from the combination of the parameters, and generate the routing information from node-partition table 124 based on a comparison of the primary key with an entry in node-partition table 124. Client library 128 maps the primary key to a node in distributed database 140. The parameters further enable client library 128 to direct the command to the corresponding node in distributed database 140 based on the routing information.

In an embodiment, the parameters associated with the command are ordered in some fashion, such as by name or by an actual issuance order. The ordering information may be used by the client and/or the server to determine the generation of the primary key.

For instance, in a simple SQL query statement: select name, address from A where zip code=? and country=?, the parameters may be a value representing the zip code. Given that the query contains a parameterized language command, there may be no naming and parameter order that determine the parameter information in building the primary key. Assuming that the primary key is constructed based on the zip code, for the first time the client-library sees this command, it sends the command to a node in the distributed database. Accordingly, the server may indicate to the client-library that the first parameter is to be used to generate the primary key for the command. The server may subsequently complete the command, and direct the command to the appropriate node in the distributed database if needed. In the event that the client application executes the same command again, the client-library may recognize the command and acknowledges that it should use the first parameter to generate the primary key. Thus, the client-library may send the command to the appropriate node in the distributed database where the command can be executed directly instead of being forwarded to the server, which is further illustrated in FIG. 5.

Figure 5:
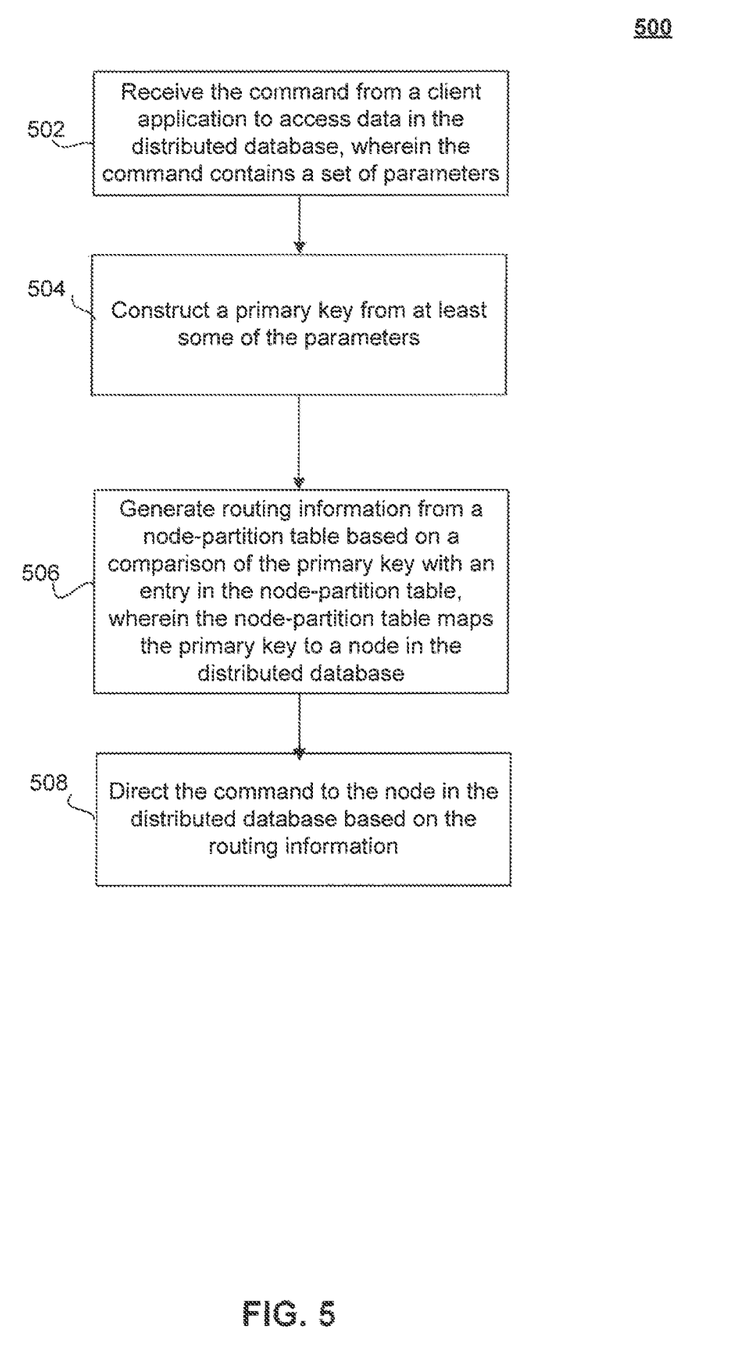
FIG. 5 is a flowchart of a method for dynamically directing a command' to a node in a distributed database, according to an embodiment.

FIG. 5 is a flowchart for a method 500 for dynamically directing a command to a node in distributed database 140, according to an embodiment. In an embodiment, method 500 is performed by a client. For ease of explanation, method 500 will be described with respect to DCS 126 of FIG. 3, which is in client 120, as described above. However, method 500 is not intended to be limited thereto.

At stage 502, the command is received from a client application to access data in the distributed database, where the command contains a set of parameters. For example, command receiver 320 receives the command from client application 120. According to one embodiment, upon receiving of the command, client library 128 performs an initial lookup to check if the same query or command matches an existing entry in node-partition table 124. If there is a match in node-partition table 124, client library 128 directs the command to its proper node based on the mapping information in node-partition table 124. Otherwise, the command is forwarded to server 110 for processing when client library 128 fails to produce a match. According to another embodiment, the command is forwarded to server 110 to determine the parameters that may be used to generate the primary key without the initial comparison with the cached node-partition table 124 by client library 128.

Figure 8:
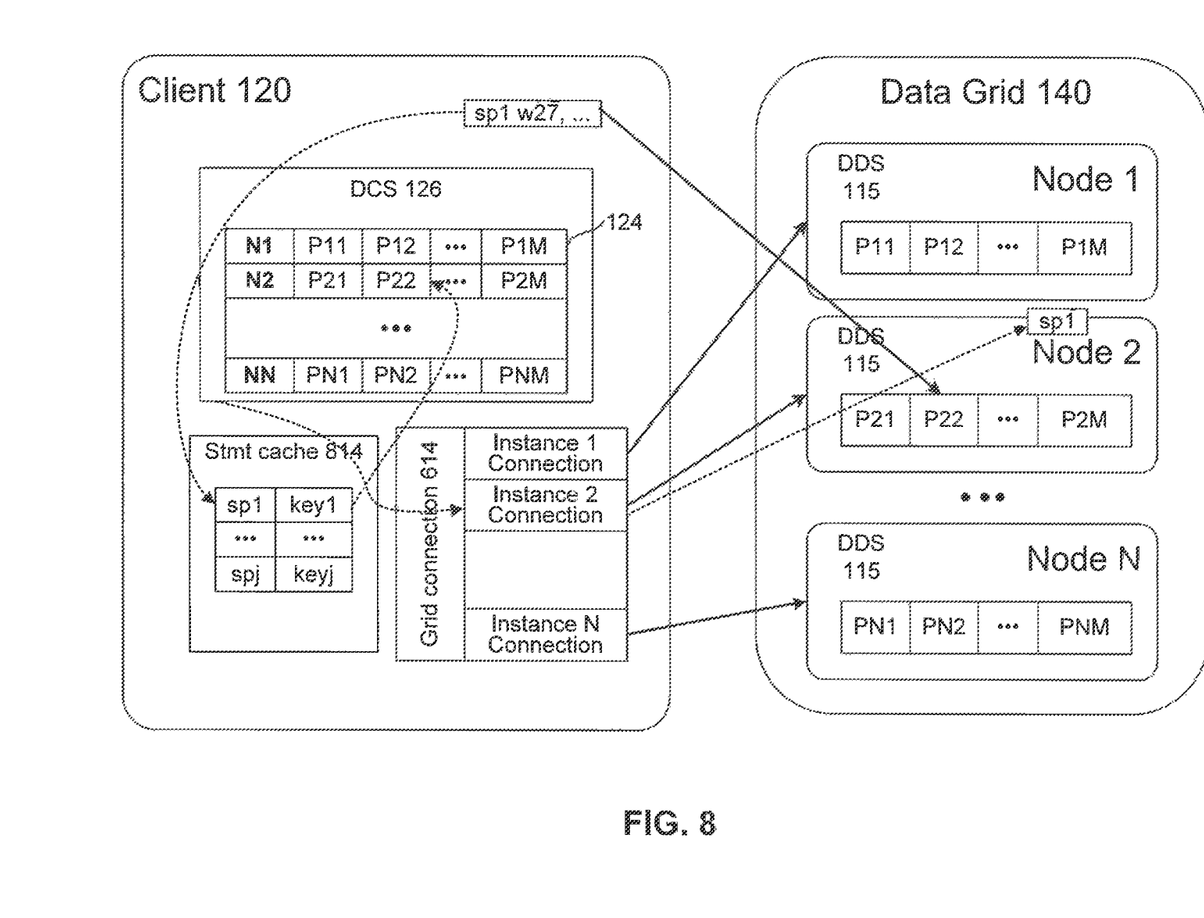
FIG. 8 depicts an example statement cache on a client, according to an embodiment.

The example initial lookup process can be further illustrated in FIG. 8, which depicts an example statement cache 814 on client 120, according to an embodiment. In this embodiment, client library 128 implements a statement cache 814 to facilitate the initial lookup. A command containing parameters such as "sp1, W27 . . . " can be searched against statement cache 814. Referring to FIG. 8, statement cache 814 contains, for example, the name of stored procedure sp1 and its corresponding key for further lookup in node-partition table 124 of DCS 126, thus eliminating the need to send the command to server 110 to determine the parameters for generating the key, assuming there is a match between the name of the command and sp1. In this example, based on key value "key1" in statement cache 814, a corresponding node (such as Node 2) can be identified from node-partition table 124. Subsequently, grid connection instance 2 may direct the command to Node 2 of data grid 140. However, if statement cache 814 fails to provide a hit, the command can be forwarded to server 110 to identify the parameter and the process proceeds to stage 504.

At stage 504, a set of parameters associated with the command that may be used to generate routing information for the command are received by DCS 126 from server 110. For example, parameter receiver 330 receives the parameters identified by server 110. In an embodiment, prior to stage 504, server 110 had examined the command and had identified a set of parameters and the order of the parameters in order to generate a primary key. In another embodiment, if the command contains parameterized language command, which may lack parameters associated with the command, the command is forwarded to server 110 bypassing the directed command system 126 on client 120. The task to handle such command may be shifted to server 110 to direct the command to its corresponding code in data grid 140. In still another embodiment, if there is no parameter associated with a set of commands, such commands may be distributed to the nodes across data grid 140 using round robin.

At stage 506, a primary key is constructed from at least some of the parameters. For example, key constructor 340 constructs the primary key.

At stage 508, the routing information is generated based on a comparison of the primary key with an entry in node-partition table 124, where node-partition table 124 maps the primary key to a node in distributed database 140. For example, routing information generator 350 generates the routing information. Referring back to FIG. 8, in this example, node-partition table 124 provides the mapping information between the primary keys and a set of nodes in data grid 140 in its internal table. For example, primary key P11 matches to Node 1 and primary key PNM matches to node NM.

At stage 510, the command is directed to the node in distributed database 140 based on the routing information. For example, command director 360 directs the command to the appropriate node.

Embodiments shown in FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
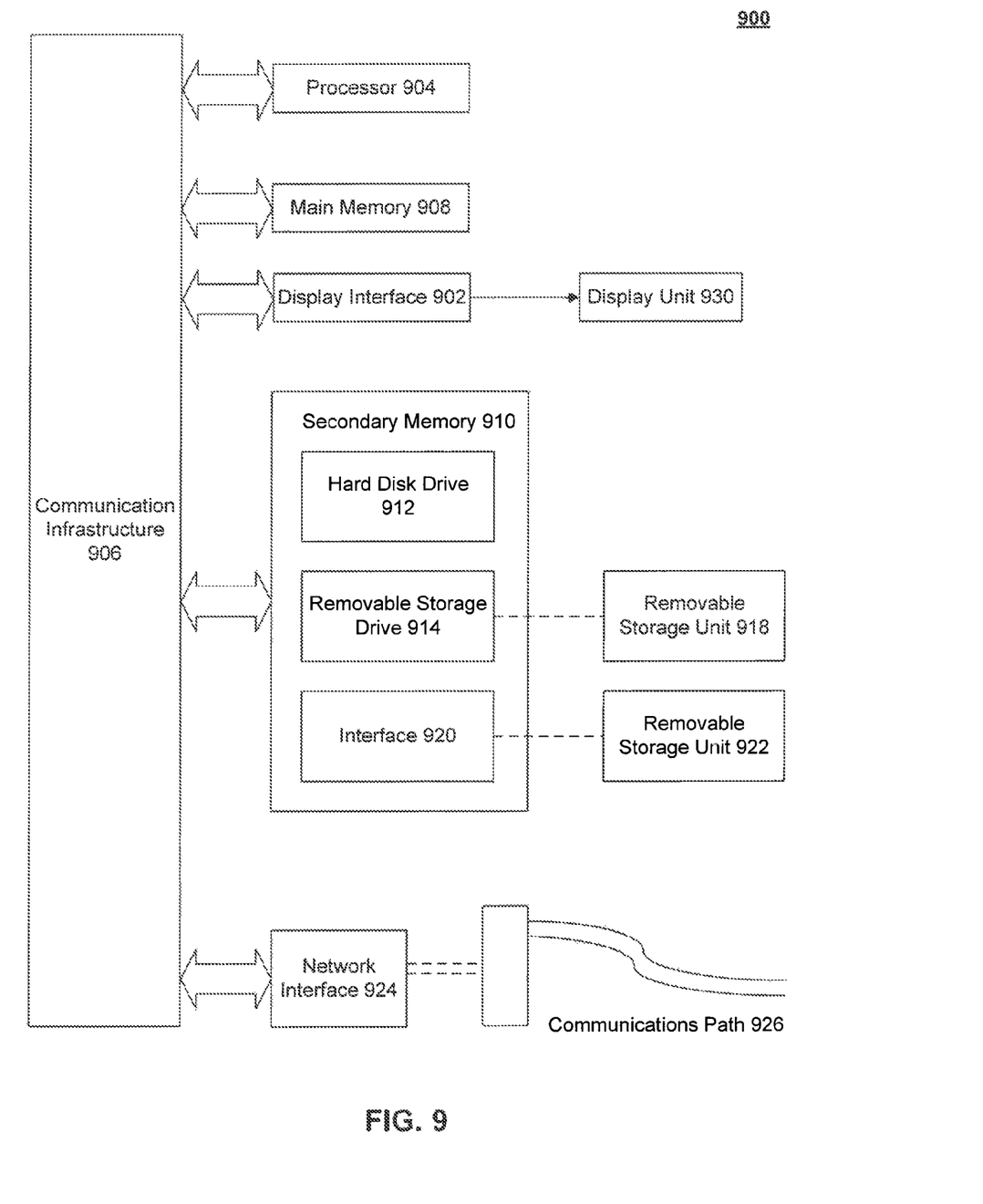
FIG. 9 is a diagram of an example computer system in which embodiments can be implemented.

FIG. 9 illustrates an example computer system 900 in which embodiments, or portions thereof, may be implemented as computer-readable code. For example, directed command system 115 and 126, including their components, as shown in FIGS. 2 and 3 can be implemented in computer system. 900 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well-known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a network interface 924. Network interface 924 allows software and data to be transferred between computer system 900 and external devices. Network interface 924 may include a modem, a network interface (such as an Ethernet card), a communications port, a PCMCIA slot and card, or the like. Software and data transferred via network interface 924 may be in the form of signals, which may be electronic, electromagnetic, optical, or other signals capable of being received by network interface 924. These signals may be provided to network interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via network interface 924. Such computer programs, when executed, enable computer system 900 to implement embodiments as discussed herein. In particular, the computer programs, when executed, enable processor device 904 to implement the processes of embodiments of the present invention, such as the stages in the methods illustrated by flowchart 600 of FIG. 6, discussed above. Accordingly, such computer programs represent controllers of the computer system 900. Where embodiments are implemented using software, the software may be stored in a computer program product and loaded into computer system 900 using removable storage drive 914, interface 920, and hard disk drive 912, or network interface 924.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for dynamically directing a command to a node in a distributed database, comprising:
   constructing a node-partition table on a client, wherein the node-partition table comprises mapping information between a set of keys and a plurality of nodes in the distributed database;
   receiving the command from a client application operating on the client to access data in the distributed database, wherein the command comprises a set of parameters;
   upon execution of the command:
      determining, at the client, that the client lacks parameter interpretation information associated with the set of parameters to construct a primary key based on the parameters;
      responsive to the determining, sending the command and the set of parameters to a server to request the parameter interpretation information;
      receiving, at the client, the parameter interpretation information associated with the set of parameters from the server;
      constructing the primary key based at least on the at least some of the parameters and the parameter interpretation information;
      generating routing information from the node-partition table stored within the client based on a comparison of the primary key with the set of keys in the node-partition table, wherein the node-partition table maps the primary key to a node among the plurality of nodes in the distributed database; and
      directing the command to the node in the distributed database based on the routing information.

2. The computer-implemented method of claim 1, wherein the constructing further comprises:
   upon receiving the parameter interpretation information on the client, constructing the primary key from at least some of the parameters based on parameter interpretation information associated with the command wherein the parameter interpretation information includes parameter ordering information for constructing the primary key.

3. The computer-implemented method of claim 1, wherein the constructing the node-partition table comprises:
   constructing the node-partition table dynamically as the client connects to the distributed database.

4. The computer-implemented method of claim 1, wherein the constructing the node-partition table comprises:
   prepopulating the node-partition table with data obtained through previous client connections to the distributed database.

5. The computer-implemented method of claim 1, wherein the parameters include order parameters.

6. The computer-implemented method of claim 1, wherein the parameters include data type parameters.

7. A computer-implemented method for dynamically directing a command to a node in a distributed database, comprising:
   receiving, at a server, the command from a client to access data in the distributed database, wherein the command comprises a set of parameters;
   in response to the receiving, generating, at the server, parameter interpretation information from the set of parameters associated with the command; and
   upon the generating, sending, by the server, the parameter interpretation information to the client, wherein the client constructs a primary key from at least some of the parameters based on the parameter interpretation information, generates routing information from a node-partition table stored within the client based on a comparison of the primary key with a set of keys in the node-partition table, and directs the command to the node among a plurality of nodes in the distributed database based on the routing information, and wherein the node-partition table maps the primary key to a node in the distributed database.

8. The computer-implemented method of claim 7, further comprising:
   dynamically updating mapping information in the node-partition table upon detecting a reconfiguration of the distributed database, wherein the mapping information maps the set of keys and a plurality of nodes in the distributed database.

9. The computer-implemented method of claim 8, further comprising:
re-directing the command to an appropriate node in the distributed database upon detecting that the command is directed to an incorrect node by the client based on the routing information generated on the client.

10. The computer-implemented method of claim 9, further comprising:
updating the node-partition table with correct mapping information between the primary key and the appropriate node in the distributed database.

11. A system for dynamically directing a command to a node in a distributed database, comprising:
a memory; and
one or more processors, coupled to the memory, and configured to:
receive, at a server, the command from a client to access data in the distributed database, wherein the command contains a set of parameters;
generate parameter interpretation information for at least some of the set of parameters associated with the command; and
send the parameter interpretation information from the server to the client in response to receiving the command and the set of parameters,
wherein the client constructs a primary key from at least some of the parameters based on the parameter interpretation information, generates routing information from a node-partition table stored within the client based on a comparison of the primary key with an entry in the node-partition table, and directs the command to the node among a plurality of nodes in the distributed database based on the routing information, and wherein the node-partition table maps the primary key to the node among the plurality of nodes.

12. The system of claim 11, wherein the one or more processors are further configured to:
dynamically update mapping information in the node-partition table upon detecting a reconfiguration of the distributed database, wherein the mapping information maps a set of keys and a plurality of nodes in the distributed database.

13. The system of claim 11, wherein the one or more processors are further configured to:
re-direct the command to an appropriate node in the distributed database upon detecting that the command is directed to an incorrect node by the client based on the routing information generated on the client.

14. The system of claim 11, wherein the one or more processors are further configured to:
update the node-partition table with correct mapping information between the primary key and the appropriate node in the distributed database.

15. The system of claim 11, wherein the parameter interpretation information includes parameter ordering information for constructing the primary key.

16. A non-transitory computer program product comprising a computer readable storage medium having instructions encoded thereon that, when executed by a processor, cause the processor to perform operations comprising:
receiving, at a server, the command from a client to access data in the distributed database, wherein the command comprises a set of parameters;
in response to the receiving, generating, at the server, parameter interpretation information from the set of parameters associated with the command; and
upon the generating, sending, by the server, the parameter interpretation information to the client, wherein the client constructs a primary key from at least some of the parameters based on the parameter interpretation information, generates routing information from a node-partition table stored within the client based on a comparison of the primary key with a set of keys in the node-partition table, and directs the command to a node among a plurality of nodes in the distributed database based on the routing information, and wherein the node-partition table maps the primary key to the node in the distributed database.

* * * * *